(12) United States Patent
Suzuki et al.

(10) Patent No.: US 12,053,816 B2
(45) Date of Patent: Aug. 6, 2024

(54) APPARATUS AND METHOD FOR MANUFACTURING RACK BAR

(71) Applicant: NETUREN CO., LTD., Tokyo (JP)

(72) Inventors: Ryosuke Suzuki, Tokyo (JP); Norimasa Sunaga, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 661 days.

(21) Appl. No.: 17/287,652

(22) PCT Filed: Oct. 18, 2019

(86) PCT No.: PCT/JP2019/041051
§ 371 (c)(1),
(2) Date: Apr. 22, 2021

(87) PCT Pub. No.: WO2020/085230
PCT Pub. Date: Apr. 30, 2020

(65) Prior Publication Data
US 2021/0379648 A1 Dec. 9, 2021

(30) Foreign Application Priority Data
Oct. 23, 2018 (JP) .................................. 2018-199511

(51) Int. Cl.
*B21K 1/76* (2006.01)
*B21J 5/12* (2006.01)
(Continued)

(52) U.S. Cl.
CPC ................. *B21K 1/768* (2013.01); *B21J 5/12* (2013.01); *B21J 9/02* (2013.01); *C21D 1/42* (2013.01);
(Continued)

(58) Field of Classification Search
CPC . B21K 1/76; B21K 1/767; B21K 1/768; B21J 5/06; B21J 5/12; B21J 9/02; B21J 9/00; B21D 43/003
See application file for complete search history.

(56) References Cited

U.S. PATENT DOCUMENTS 3,165,766 A * 1/1965 Wisebaker ............... B21J 13/08
72/422
3,672,200 A * 6/1972 Ogasawara ................ B21J 5/12
72/285
(Continued)

FOREIGN PATENT DOCUMENTS

CN 1421346 6/2003
CN 101269390 9/2008
(Continued)

OTHER PUBLICATIONS

International Search Report and Written Opinion of the International Searching Authority, issued Dec. 11, 2019 in corresponding International Patent Application No. PCT/JP2019/041051.

*Primary Examiner* — Teresa M Ekiert
(74) *Attorney, Agent, or Firm* — Wenderoth, Lind & Ponack, L.L.P.

(57) ABSTRACT

An apparatus for manufacturing a rack bar includes a pre-forming machine forming a flattened portion on an outer peripheral surface of a hollow shaft member, a teeth forming machine forming rack teeth on the flattened portion, a heat treatment machine quenching the rack teeth, a first conveying machine carrying the shaft member into and from the pre-forming machine, a second conveying machine carrying the shaft member into and from the teeth forming machine, and a third conveying machine carrying the shaft member into and from the heat treatment machine. The first conveying machine, the second conveying machine, and the third conveying machine hold one end of the shaft member from (Continued)

a radially inner side of the shaft member. The apparatus of the rack bar are suitable for manufacturing a relatively short hollow rack bar having rack teeth formed over substantially an entire length of a shaft member.

4 Claims, 19 Drawing Sheets

(51) Int. Cl.
*B21J 9/02* (2006.01)
*C21D 1/42* (2006.01)
*C21D 1/667* (2006.01)
*C21D 9/00* (2006.01)

(52) U.S. Cl.
CPC .......... *C21D 1/667* (2013.01); *C21D 9/0068* (2013.01); *C21D 2221/10* (2013.01)

(56) References Cited

U.S. PATENT DOCUMENTS

2003/0097894 A1 5/2003 Ozeki
2004/0182125 A1* 9/2004 McLean ................ B21K 1/767
72/361

| 2008/0229803 | A1 | 9/2008 | Yamawaki et al. |
| 2012/0192612 | A1 | 8/2012 | Schaefer |
| 2016/0271726 | A1 | 9/2016 | Suzuki et al. |
| 2017/0100796 | A1 | 4/2017 | Suzuki et al. |

FOREIGN PATENT DOCUMENTS

| CN | 102581839 | 7/2012 |
| CN | 206355162 | 7/2017 |
| CN | 209664223 | 11/2019 |
| FR | 1.442.832 | 6/1966 |
| JP | 63-297524 | 12/1988 |
| JP | 10-158742 | 6/1998 |
| JP | 2001-11536 | 1/2001 |
| JP | 2008-229675 | 10/2008 |
| JP | 2008-229676 | 10/2008 |
| JP | 2009-262694 | 11/2009 |
| JP | 2011-062733 | 3/2011 |
| JP | 2011-89150 | 5/2011 |
| JP | 2012-524662 | 10/2012 |
| JP | 2014-124767 | 7/2014 |
| JP | 2017-137536 | 8/2017 |
| JP | 2018-69280 | 5/2018 |
| WO | 2020/085230 | 4/2020 |

* cited by examiner

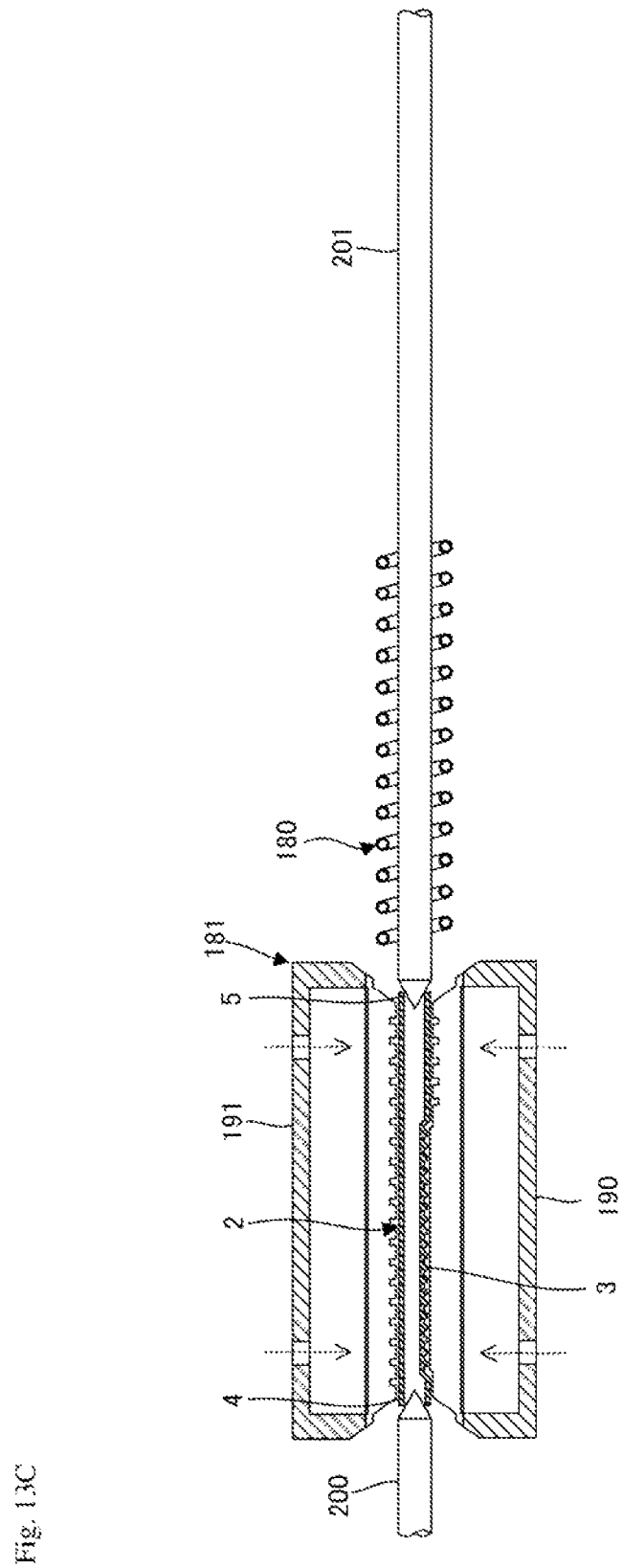

APPARATUS AND METHOD FOR MANUFACTURING RACK BAR

TECHNICAL FILED

The present invention relates to a rack bar manufacturing apparatus and a rack bar manufacturing method.

BACKGROUND ART

An example of a rack bar used in a rack and pinion type steering apparatus or the like includes a solid rack bar having rack teeth formed on a solid shaft member and a hollow rack bar having rack teeth formed on a hollow shaft member to reduce weight.

According to a first related art, the hollow rack bar is manufactured, for example, as follows. First, a flattened portion is formed on an outer peripheral surface of the hollow shaft member by pressing a punch against the outer peripheral surface of the hollow shaft member (see, for example, JP2009-262694A). Next, a mandrel is press-fitted inside the flattened portion in a state in which a rack teeth forming die is pressed against the flat outer surface of the flattened portion, and the press-fitting of the mandrel is repeated in a way the mandrel to be press-fitted is gradually replaced to a larger one, whereby the rack teeth are formed on the outer surface of the flattened portion (see, for example, JP2008-229676A). Then, in order to increase the hardness of the rack teeth, the rack teeth are quenched (see, for example, JPH10-158742A).

The rack bar used in a dual pinion assist electric power steering apparatus includes two sets of rack teeth—a first set of rack teeth that meshes with a steering pinion of a steering shaft, and a second set of rack teeth that meshes with an auxiliary pinion of an assist mechanism.

For example, according to a second related art, a solid extension shaft is joined to one end of the hollow rack bar on which a first set of rack teeth is formed, and a second set of rack teeth is formed on the extension shaft. The second set of rack teeth is formed using a processing apparatus such as a broaching machine after the extension shaft member is joined to the hollow rack bar (see, for example, JP2014-124767A).

In the first related art, the rack teeth are formed in a partial section of the hollow shaft member in a length direction. When forming the flattened portion and when forming the rack teeth on the flattened portion, the partial section of the shaft member is accommodated in a die with an end portion of the shaft member being arranged to protrude from the die, and when quenching the rack teeth, the partial section of the shaft member is accommodated in a heating coil with the end portion of the shaft member being disposed to protrude from the heating coil. Therefore, the carrying in and out of the shaft member with respect to the die and the heating coil is performed by gripping the end portion of the shaft member protruding from the die or the heating coil (see, for example, JP2008-229676A).

On the other hand, in the second related art, the first set of rack teeth of the hollow rack bar may be formed, for example, over substantially the entire length from one end portion to the other end portion of the hollow shaft member. In this case, when forming the flattened portion and when forming the rack teeth on the flattened portion, the entire shaft member is accommodated in the die, and when quenching the rack teeth, the entire shaft member is accommodated in the heating coil. For this reason, a grip portion protruding from the die and the heating coil is not present in the shaft member, and there is an inconvenience in the carrying in and out of the shaft member with respect to the die and the heating coil. The inconvenience in the carrying in and out of the shaft member can be solved by setting an extra length protruding from the die and the heating coil for the shaft member and cutting the extra length after the quenching of the rack teeth is completed, but the material is wasted.

SUMMARY

Illustrative aspects of the present invention provide a manufacturing apparatus and a manufacturing method suitable for manufacturing a relatively short hollow rack bar having rack teeth formed over substantially an entire length of a hollow shaft member.

According to an illustrative aspect of the present invention, an apparatus for manufacturing a rack bar includes a pre-forming machine configured to form a flattened portion extending in an axial direction of a hollow shaft member on an outer peripheral surface of the hollow shaft member, a teeth forming machine configured to form rack teeth on a flat outer surface of the flattened portion, a heat treatment machine configured to quench the rack teeth, a first conveying machine configured to carry the hollow shaft member into the pre-forming machine and to carry out the hollow shaft member on which the flattened portion is formed from the pre-forming machine, a second conveying machine configured to carry the hollow shaft member on which the flattened portion is formed into the teeth forming machine and to carry out the hollow shaft member on which the rack teeth are formed on the flattened portion from the teeth forming machine, and a third conveying machine configured to carry the hollow shaft member on which the rack teeth are formed into the heat treatment machine and to carry out the hollow shaft member in which the rack teeth are quenched from the heat treatment machine. The first conveying machine, the second conveying machine, and the third conveying machine are configured to hold at least one end of the hollow shaft member from a radially inner side of the hollow shaft member.

According to another illustrative aspect of the present invention, a method for manufacturing a rack bar includes forming a flattened portion extending in an axial direction of a hollow shaft member on an outer peripheral surface of the hollow shaft member, forming rack teeth on a flat outer surface of the flattened portion, and quenching the rack teeth. Each of the forming of the flattened portion, the forming of the rack teeth and the quenching includes conveying the hollow shaft member while holding a radially inner side in at least one end of the hollow shaft member from a radially inner side of the hollow shaft member.

BRIEF DESCRIPTION OF DRAWINGS

FIG. 13C is a schematic view of a heat treatment process performed by the heat treatment machine in FIG. 11.

DESCRIPTION OF EMBODIMENTS

Figure 1:
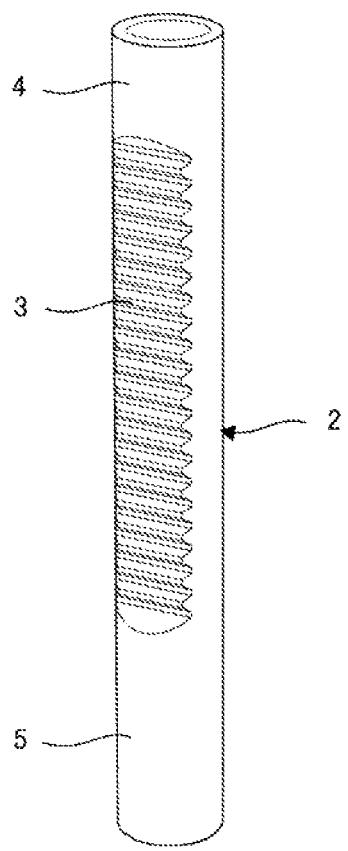
FIG. 1 is a perspective view of an example of a rack bar for explaining an embodiment of the present invention.

FIG. 1 shows an example of a rack bar for explaining an embodiment of the present invention.

A rack bar 1 shown in FIG. 1 is a so-called hollow rack bar consisting of a hollow shaft member 2 having a circular cross section. A rack teeth 3 are formed on an outer peripheral surface of the shaft member 2, and the rack teeth 3 extend in an axial direction from one end portion to the other end portion of the shaft member 2. A cross-sectional shape of a section in the shaft member 2 in which the rack teeth 3 is formed (hereinafter referred to as a rack toothed section) is non-circular, and a cross-sectional shape of a section except the rack toothed section is circular. The length of the shaft portion 4 having a circular cross section remaining on one end portion side and the length of the shaft portion 5 having a circular cross section remaining on the other end portion side are shorter than the length of the rack toothed section, and the shaft member 2 is relatively short in relation to the rack toothed section. The hollow rack bar 1 is manufactured, for example, as follows.

FIGS. 2A to 2D schematically show a manufacturing process of the hollow rack bar 1.

Figure 2A:
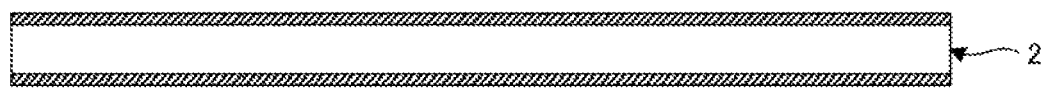
FIG. 2A is a schematic view of an example of a manufacturing process of the rack bar in FIG. 1.

As shown in FIG. 2A, the shaft member 2 as a material is a hollow shaft member having a circular cross section made of steel such as JIS-S45C, for example, and both ends of the shaft member 2 in the axial direction are open. The shaft member 2 is typically subjected to a zinc phosphate coating treatment that improves moldability and corrosion resistance.

<Pre-Forming Process>

Figure 2B:
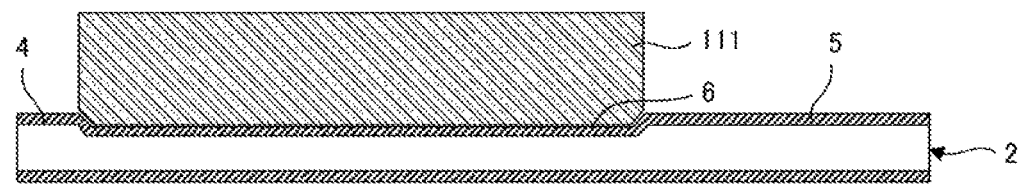
FIG. 2B is a schematic view of an example of a manufacturing process of the rack bar in FIG. 1.

As shown in FIG. 2B, a flattened portion 6 extending in the axial direction from one end portion to the other end portion of the shaft member 2 is formed on the outer peripheral surface of the shaft member 2. The flattened portion 6 is formed by pressing a flattening punch 111 against the outer peripheral surface of the shaft member 2 and crushing the outer peripheral surface of the shaft member 2 into a flat shape in the vicinity of a tooth bottom height of the rack teeth 3 formed in the teeth forming process shown in FIG. 2C.

<Teeth Forming Process>

Figure 2C:
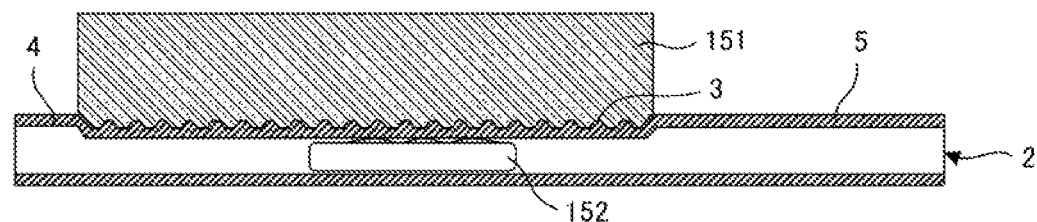
FIG. 2C is a schematic view of an example of a manufacturing process of the rack bar in FIG. 1.

Next, as shown in FIG. 2C, the rack teeth 3 are formed on the flat outer surface of the flattened portion 6. A mandrel 152 is press-fitted inside the flattened portion 6 in a state in which a rack teeth forming die 151 is pressed against a flat outer surface of the flattened portion 6, and the press-fitting of the mandrel 152 is repeated by gradually increasing the diameter of the mandrel 152, so that the rack teeth 3 are formed.

<Heat Treatment Process>

Figure 2D:
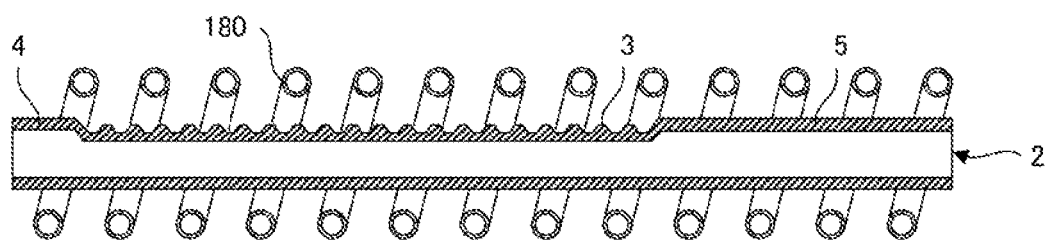
FIG. 2D is a schematic view of an example of a manufacturing process of the rack bar in FIG. 1.

Next, as shown in FIG. 2D, the rack teeth 3 are quenched in order to increase the hardness of the rack teeth 3. The heating during quenching can be performed by high-frequency induction heating using a heating coil 180.

Thereafter, processing such as straightening the bending of the shaft member 2 due to the formation of the flattened portion 6 and the rack teeth 3, polishing of a tooth back surface having a circular cross section positioned on a side of the outer peripheral surface of the shaft member 2 opposite to the rack teeth 3, and cutting of radially inner side of the shaft portion 4 and/or the radially inner side of the shaft portion 5 are appropriately performed to manufacture the hollow rack bar 1.

Figure 3:
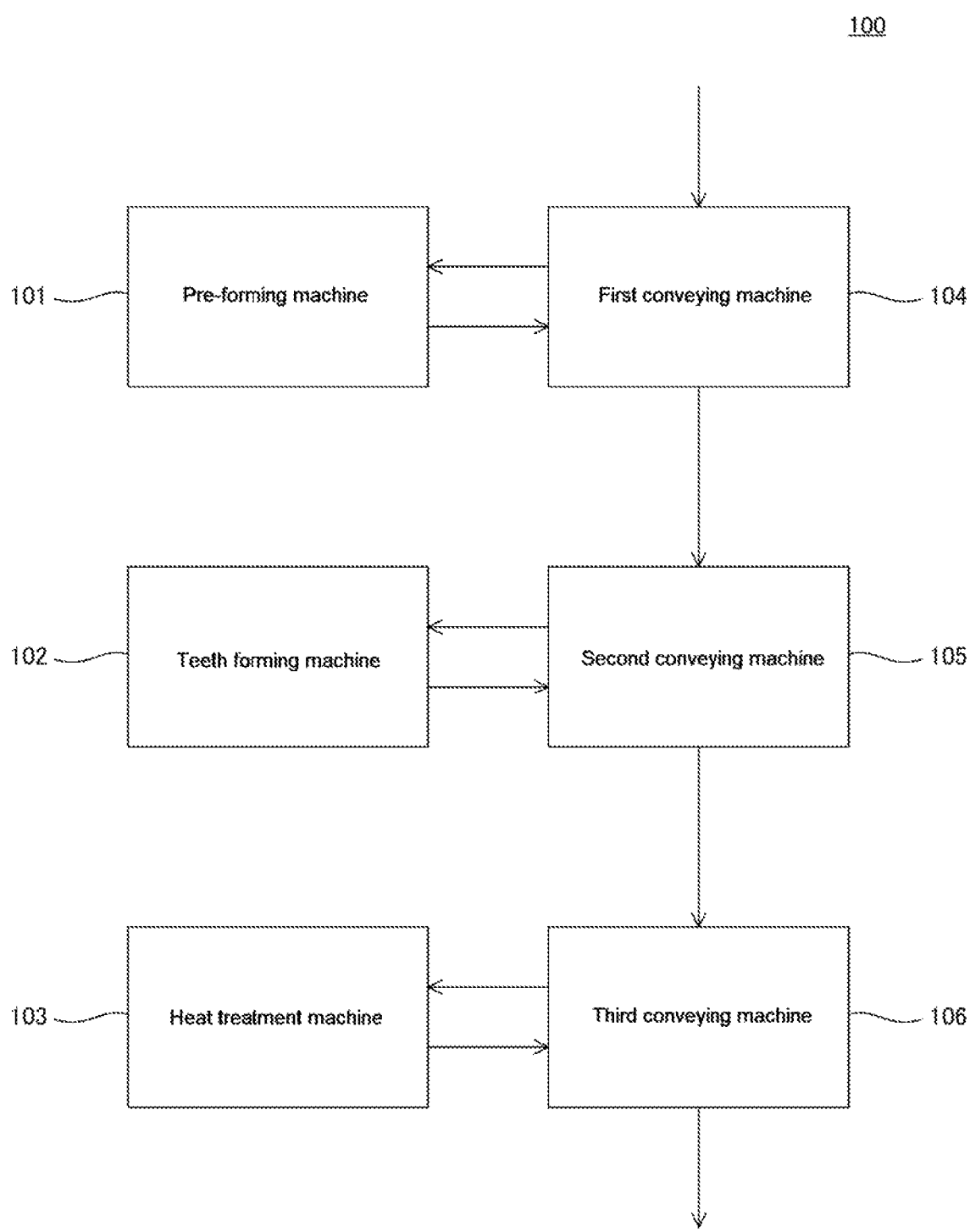
FIG. 3 is a schematic view of an example of a rack bar manufacturing apparatus for explaining an embodiment of the present invention.

FIG. 3 shows a schematic configuration of a manufacturing apparatus that performs a manufacturing process of the hollow rack bar 1 shown in FIGS. 2A to 2D.

A manufacturing apparatus 100 includes a pre-forming machine 101, a teeth forming machine 102, a heat treatment machine 103, a first conveying machine 104, a second conveying machine 105, and a third conveying machine 106. The pre-forming machine 101, the teeth forming machine 102, and the heat treatment machine 103 are disposed along a predetermined manufacturing line, and appropriate stockers (not shown) in which the shaft member 2 is placed is provided on a line upstream side of the pre-forming machine 101, between the pre-forming machine 101 and the teeth forming machine 102, between the teeth forming machine and the heat treatment machine 103, and a line downstream side of the heat treatment machine 103.

The pre-forming machine 101 performs the pre-forming process shown in FIG. 2B, and the flattened portion 6 is formed on the outer peripheral surface of the hollow shaft member 2. The first conveying machine 104 takes out the shaft member 2 from the stocker provided on the line upstream side of the pre-forming machine 101, and carries the shaft member 2 into the pre-forming machine 101. Further, the first conveying machine 104 carries out the shaft member 2 in which the flattened portion 6 is formed thereon from the pre-forming machine 101, and places the shaft member 2 in the stocker provided between the pre-forming machine 101 and the teeth forming machine 102.

The teeth forming machine 102 performs the teeth forming process shown in FIG. 2C, and the rack teeth 3 are formed on the flat outer surface of the flattened portion 6 of the shaft member 2. The second conveying machine 105 takes out the shaft member 2 from the stocker provided between the pre-forming machine 101 and the teeth forming machine 102, and carries the shaft member 2 into the teeth forming machine 102. The second conveying machine 105 carries the shaft member 2 on which the rack teeth 3 are formed from the teeth forming machine 102, and places the shaft member 2 in the stocker provided between the teeth forming machine 102 and the thermal treatment portion 103.

The heat treatment machine 103 performs the heat treatment process shown in FIG. 2D, and the rack teeth 3 are quenched. The third conveying machine 106 takes out the shaft member 2 from the stocker provided between the teeth forming machine 102 and the heat treatment machine 103, and carries the shaft member 2 into the heat treatment machine 103. Further, the third conveying machine 106 carries out the shaft member 2 in which the rack teeth 3 is quenched from the heat treatment machine 103, and places the shaft member 2 in the stocker provided on the downstream side of the heat treatment machine 103.

Hereinafter, each portion of the pre-forming machine 101, the teeth forming machine 102, and the heat treatment machine 103 will be described in order.

Figure 4:
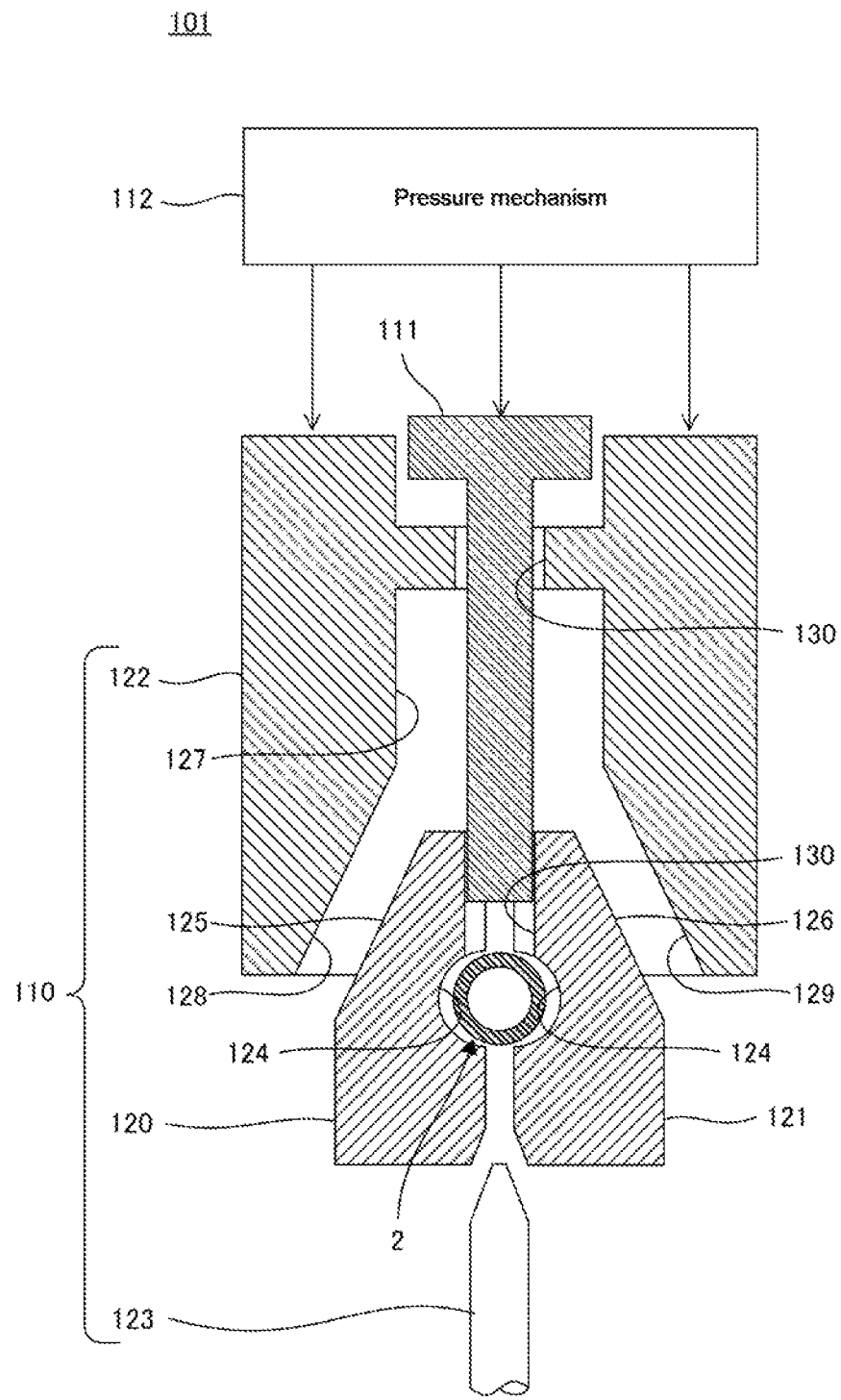
FIG. 4 is a vertical cross-sectional view of a pre-forming machine of the manufacturing apparatus in FIG. 3.
Figure 5:
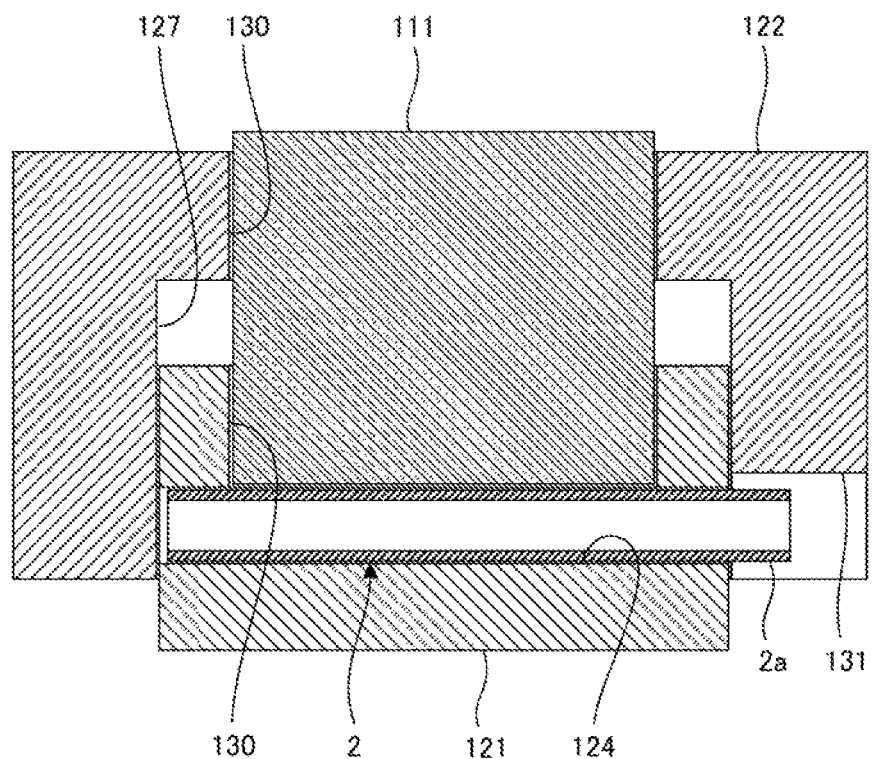
FIG. 5 is a transverse sectional view of the pre-forming machine in FIG. 4.

FIGS. 4 and 5 show an example of the pre-forming machine 101.

The pre-forming machine 101 includes a pre-forming die 110, a flattening punch 111, and a pressure mechanism 112.

The pre-forming die 110 includes a left die 120 and a right die 121 that can be opened and closed in a left-right direction, a support block 122, and an eject pin 123. The eject pin 123 is provided on the lower side of the left die 120 and the right die 121, and is inserted between the left die 120 and the right die 121 which are abutted to separate the left die 120 and the right die 121.

In each of abutting surfaces of the left die 120 and the right die 121, a holding groove 124 having a semicircular cross section is formed so as to cross the abutting surfaces in a front-rear direction. These holding grooves 124 are combined with each other when the left die 120 and the right die 121 are closed to form a cylindrical molding space that can accommodate substantially the entire shaft member 2, and hold the outer peripheral surface of the shaft member 2 that is accommodated therein.

An inclined surface 125 inclined in the upper-lower direction is provided on the outer side surface of the left die 120 opposite to the abutting surface, and the inclined surface 125 extends from the upper surface of the left die 120 to at least a position of a lower end of the holding groove 124. A similar inclined surface 126 is also provided on the outer surface of the right die 121.

A recess 127 for accommodating the left die 120 and the right die 121 is formed on the lower surface of the support block 122. The left and right side surfaces of the recess 127 are provided with an inclined surface 128 sliding on the inclined surface 125 of the left die 120 and an inclined surface 129 sliding on the inclined surface 126 of the right die 121.

The support block 122 is pushed down by the pressure mechanism 112. By pushing down the support block 122, the inclined surfaces 128, 129 of the support block 122 is engaged with the inclined surface 125 of the left die 120 and the inclined surface 126 of the right die 121. Due to the engagement of these inclined surfaces, the downward pressing force acting on the support block 122 is converted into a pressing force in the left-right direction and acts on the left die 120 and the right die 121. Accordingly, the left die 120 and the right die 121 are closed and firmly held in a closed state.

A through hole 130 communicating with the molding space through the left die 120 and the right die 121 and the support block 122 in the upper-lower direction is formed on the left die 120, the right die 121, and the support block 122. The flattening punch 111 is disposed in the through hole 130, is supported by the support block 122 so as to be movable up and down, and is pushed down by the pressure mechanism 112.

Further, in the support block 122, a communication hole 131 is formed which is disposed on an axis of the cylindrical molding space and communicates with the molding space. One end portion 2a of both end portions of the shaft member 2 is exposed to the outside of the die through the communication hole 131. The end portion of the shaft member 2 exposed to the outside of the die through the communication hole 131 may be accommodated in the molding space, or may be disposed in the communication hole 131.

FIGS. 6A to 6D illustrate a pre-forming process performed by the pre-forming machine 101.

Figure 6A:
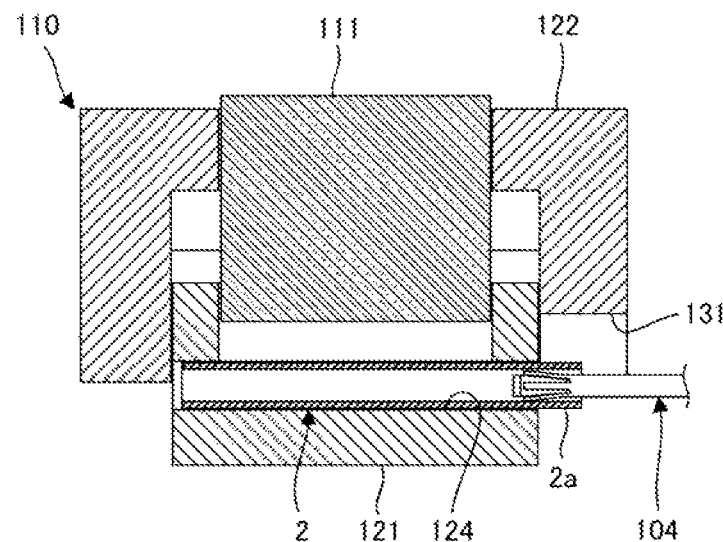
FIG. 6A is a schematic view of a pre-forming process performed by the pre-forming machine in FIG. 4.

First, as shown in FIG. 6A, the support block 122 and the flattening punch 111 are raised by the pressure mechanism 112, and the shaft member 2 is carried into the pre-forming die 110 by the first conveying machine 104 in a state where the left die 120 and the right die 121 are opened. The shaft member 2 is disposed at a predetermined position between the holding groove 124 of the left die 120 and the holding groove 124 of the right die 121 through the communication hole 131 of the support block 122.

Figure 6B:
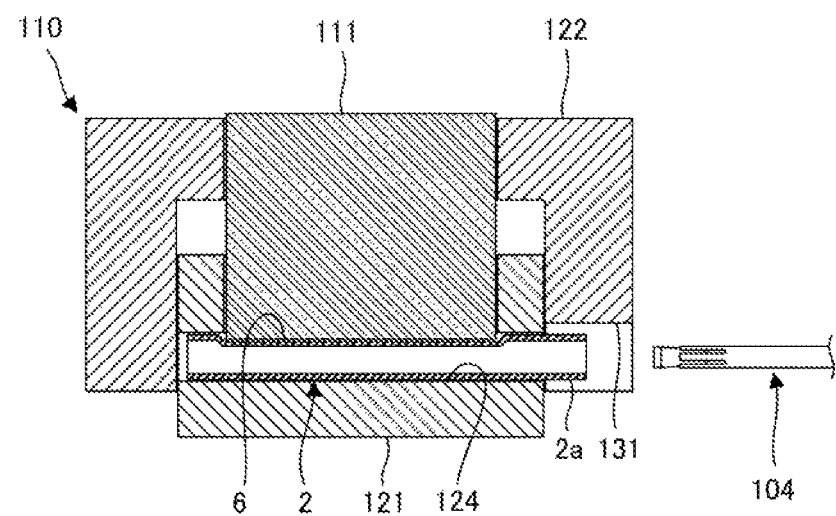
FIG. 6B is a schematic view of a pre-forming process performed by the pre-forming machine in FIG. 4.

Next, as shown in FIG. 6B, the first conveying machine 104 releases the holding of the shaft member 2 and is retracted from the pre-forming die 110. Then, the support block 122 is pushed down, and the left die 120 and the right die 121 are closed. Substantially the entire of the shaft member 2 is accommodated in the molding space, and the outer peripheral surface of the shaft member 2 accommodated in the molding space is held by each of the holding grooves 124 of the left die 120 and the right die 121. Then, the flattening punch 111 is pressed down and pressed against the outer peripheral surface of the shaft member 2. Accordingly, the flattened portion 6 is formed on the outer peripheral surface of the shaft member 2.

Figure 6C:
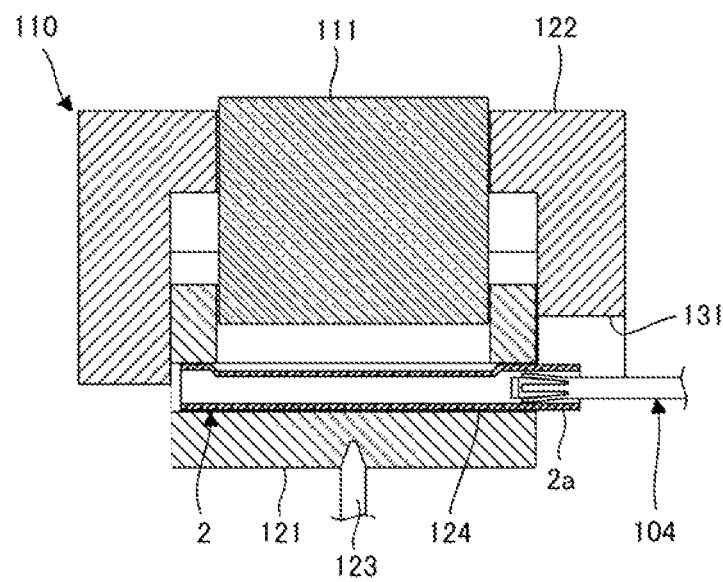
FIG. 6C is a schematic view of a pre-forming process performed by the pre-forming machine in FIG. 4.

Next, as shown in FIG. 6C, the first conveying machine 104 holds the shaft member 2 again through the communication hole 131 of the support block 122. Then, the support block 122 and the flattening punch 111 are raised, and the eject pin 123 is inserted between the left die 120 and the right die 121. Accordingly, the left die 120 and the right die 121 are separated.

Figure 6D:
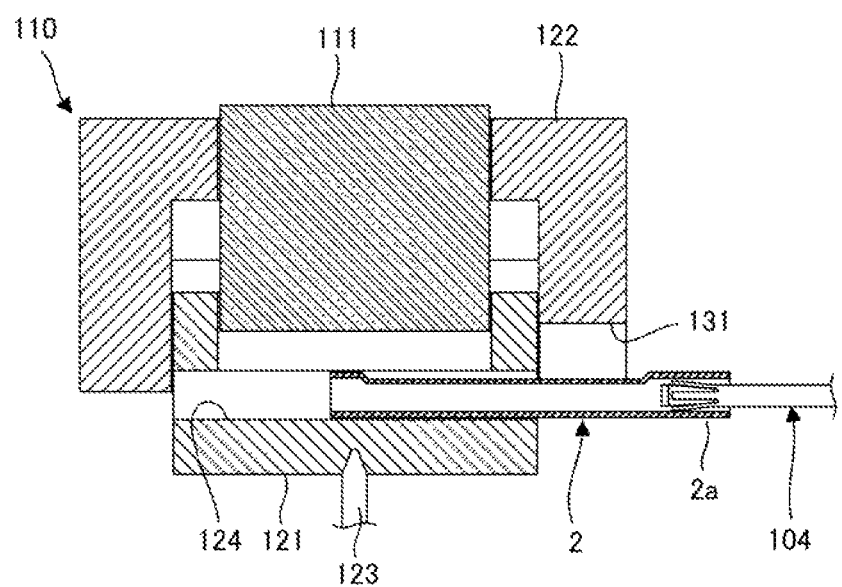
FIG. 6D is a schematic view of a pre-forming process performed by the pre-forming machine in FIG. 4.

Then, as shown in FIG. 6D, the first conveying machine 104 holding the shaft member 2 is retracted from the pre-forming die 110. Accordingly, the shaft member 2 is carried out of the pre-forming die 110 through the communication hole 131 of the support block 122.

In the pre-forming process shown in FIGS. 6A to 6D, the entire shaft member 2 is accommodated in the pre-forming die 110, and the grip portion protruding from the pre-forming die 110 is not present in the shaft member 2. Therefore, the first conveying machine 104 holds the radially inner side of one end portion 2a of the shaft member 2 through the communication hole 131 of the support block 122, and carries in and out the shaft member 2.

Figure 7:
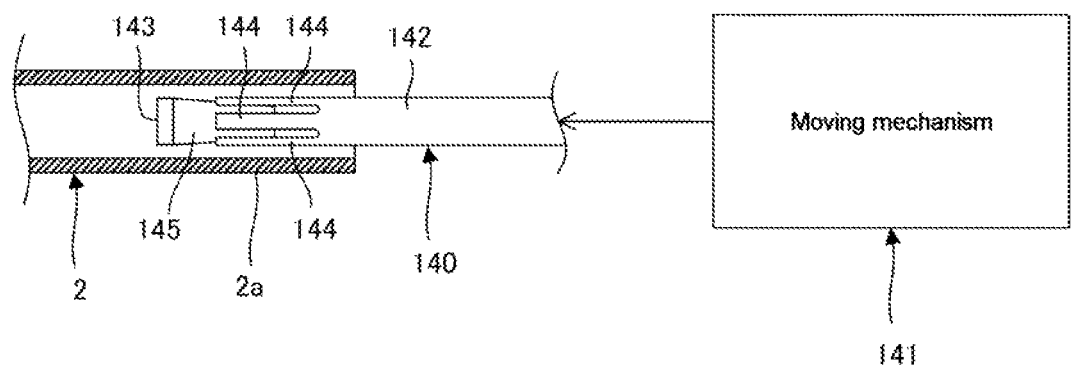
FIG. 7 is a schematic view of a first conveying machine of the manufacturing apparatus in FIG. 3.
Figure 8:
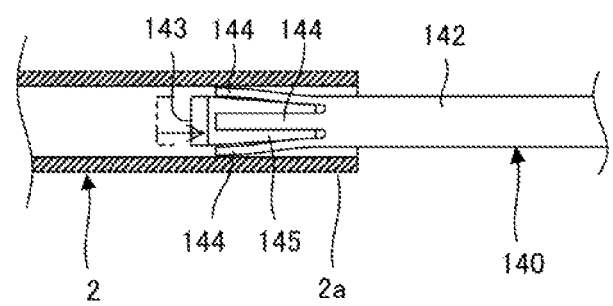
FIG. 8 is a schematic view showing an operation of the first conveying machine in FIG. 7.

FIGS. 7 and 8 show an example of the first conveying machine 104.

The first conveying machine 104 includes a holding portion 140 and a moving mechanism 141 for moving the holding portion 140. The holding portion 140 is disposed so as to face the communication hole 131 of the support block 122 on the axis of the molding space of the pre-forming die 110 (see FIGS. 6A to 6D), and is moved back and forth along the axis. The moving mechanism 141 is, for example, a multi-joint robot or a linear pusher.

The holding portion 140 can be inserted into the end portion 2a of the shaft member 2 and can expand and contract in the radial direction. In the example illustrated in FIGS. 7 and 8, the holding portion 140 includes a cylindrical chuck 142 and a draw bar 143 inserted into the chuck 142. The outer diameter of the chuck 142 is smaller than the inner diameter of the shaft member 2. A tip end portion of the chuck 142 is divided into a plurality of claws 144 by a slit extending from the tip end, and the claws 144 are flexible. A tip end portion 145 of the draw bar 143 protrudes from the tip end of the chuck 142 and is formed in an inverse tapered shape.

FIG. 8 illustrates the operation of the holding portion 140, in which the draw bar 143 is drawn toward a base end side of the chuck 142 by a driving portion (not shown) in a state where the holding portion 140 is inserted into the end portion 2a of the shaft member 2. With the drawing of the draw bar 143, the plurality of claws 144 of the chuck 142 slides on the inverse-tapered tip end portion 145 of the draw bar 143, and is deflected to the outer diameter side of the chuck 142. Accordingly, the chuck 142 is enlarged in the radial direction as a whole, and holds the radially inner side of the end portion 2a of the shaft member 2. On the other hand, when the draw bar 143 is pushed out toward the tip end side of the chuck 142, the chuck 142 is reduced in the radial direction as a whole, and the holding of the shaft member 2 is released.

According to the above configuration, even when the entire shaft member 2 is accommodated in the pre-forming die 110, the holding portion 140 can hold the radially inner side of one end portion 2a of the shaft member 2 through the communication hole 131 of the support block 122, and can carry in and out of the shaft member 2.

Figure 9:
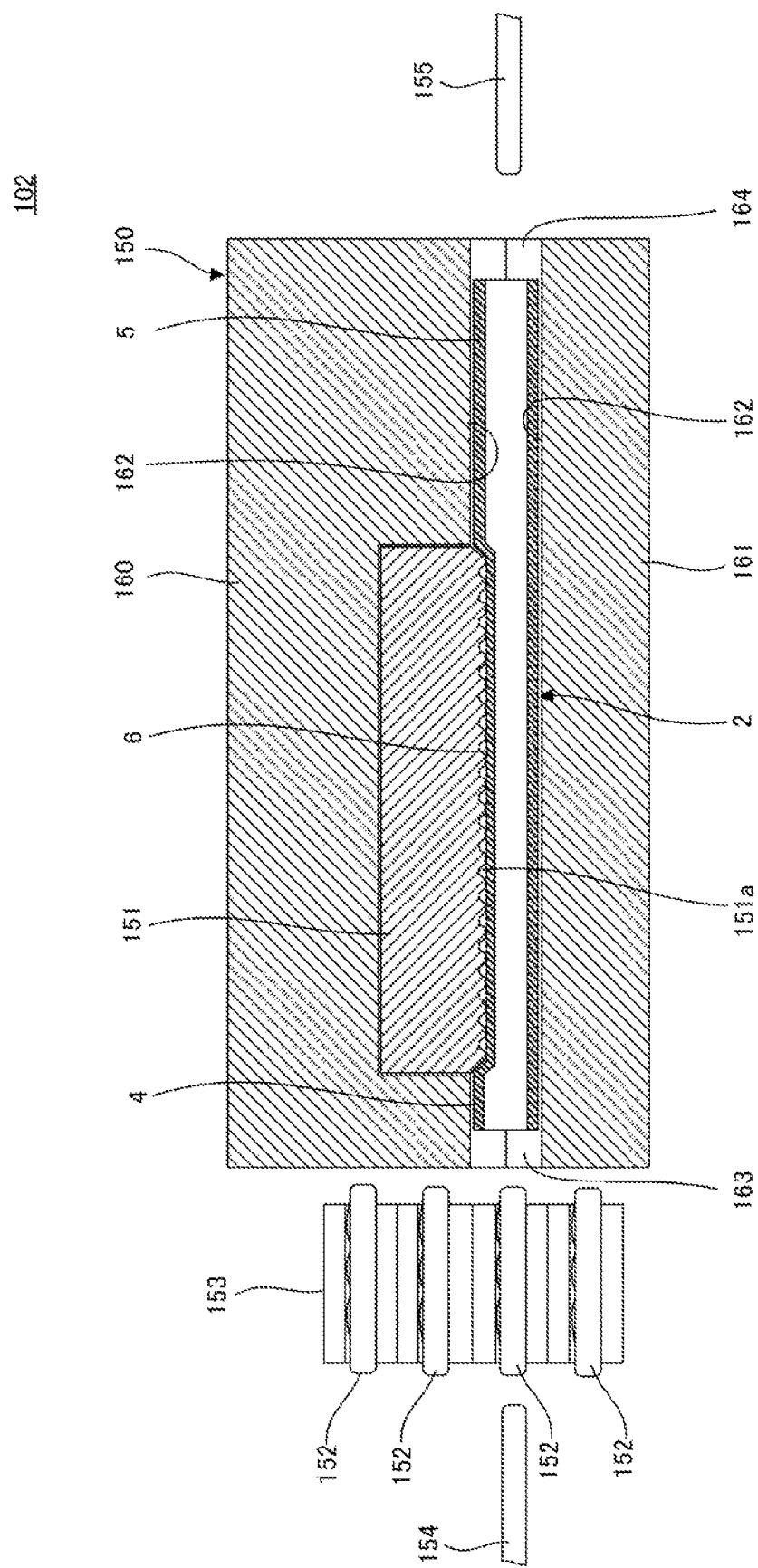
FIG. 9 is a transverse sectional view of a teeth forming machine of the rack bar manufacturing apparatus in FIG. 3.

FIG. 9 shows an example of the teeth forming machine 102.

The teeth forming machine 102 includes a teeth forming die 150, a rack teeth forming die 151, a plurality of mandrels 152, a mandrel holder 153 that stores the mandrels 152, a first pushrod 154 for pushing the mandrels 152, and a second pushrod 155 for pushing the mandrels 152.

The teeth forming die 150 includes an upper die 160 and a lower die 161 that can be opened and closed in the upper-lower direction, and the upper die 160 and the lower die 161 are opened and closed by an opening/closing mechanism (not shown). In each of abutting surfaces of the upper die 160 and the lower die 161, a holding groove 162 having a semicircular cross section crossing the abutting surface in the front-rear direction is formed. These holding grooves 162 are combined with each other when the upper die 160 and the lower die 161 are closed to form a cylindrical molding space in which the entire shaft member 2 can be accommodated, and holds the outer peripheral surface of the accommodated shaft member 2.

Both end portions of the cylindrical molding space are opened to the outside of the die. A shaft portion 4 (first end portion) having a circular cross section remaining on one end portion side of the shaft member 2 in which the flattened portion 6 is formed is exposed to the outside of the die through one end portion of the molding space, and a circular shaft portion 5 (second end portion) remaining on the other end portion side of the shaft member 2 is exposed to the outside of the die through the other end portion of the molding space.

Hereinafter, one end portion of the molding space for exposing the shaft portion 4 of the shaft member 2 is referred to as a first communication hole 163 of the teeth forming die 150, and one end portion of the molding space for exposing the shaft portion 5 is referred to as a second communication hole 164 of the teeth forming die 150.

The rack teeth forming die 151 is detachably attached to the upper die 160, and is disposed so as to face the flat outer surface of the flattened portion 6 of the shaft member 2 accommodated in the molding space. A plurality of tooth grooves for molding the rack teeth 3 are provided on the surface 151a of the rack teeth forming die 151 in contact with the outer surface of the flattened portion 6.

The mandrel holder 153 is provided on the axis of the molding space, and is disposed adjacent to the teeth forming die 150 on one side of the teeth forming die 150. The mandrel holder 153 stores the plurality of mandrels 152, one mandrel 152 thereof is selected, and the selected mandrel 152 is disposed on the axis of the molding space.

The first pushrod 154 is provided on the axis of the molding space, and the mandrel holder 153 is sandwiched between the first pushrod 154 and the teeth forming die 150. The first pushrod 154 is moved back and forth along the axis of the molding space by a driving mechanism (not shown). When the first pushrod 154 is moved toward the teeth forming die 150, the first pushrod 154 is inserted into the shaft member 2 from the opening of the shaft portion 4 through the first communication hole 163 of the teeth forming die 150. In addition, the mandrel 152 disposed on the axis of the molding space is pushed by the first pushrod 154 and inserted into the shaft member 2.

The second pushrod 155 is provided on the axis of the molding space, and the teeth forming die 150 is sandwiched between the second pushrod 155 and the mandrel holder 153 with the first pushrod 154. The second pushrod 155 is moved back and forth along the axis of the molding space by a driving mechanism (not shown). When the second pushrod 155 is moved toward the teeth forming die 150, the second pushrod 155 is inserted into the shaft member 2 from the opening of the shaft portion 5 through the second communication hole 164 of the teeth forming die 150. The mandrel 152 inserted into the shaft member 2 is pushed back by the second pushrod 155.

FIGS. 10A to 10E illustrate a teeth forming process performed by the teeth forming die 102.

Figure 10A:
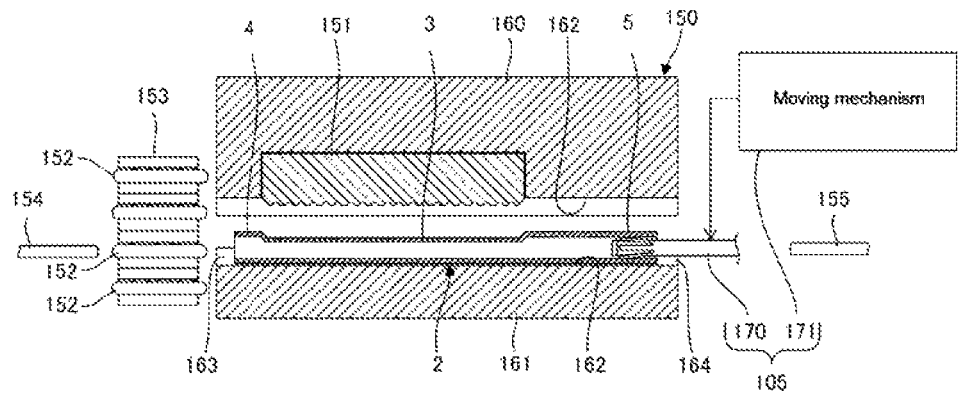
FIG. 10A is a schematic view of a teeth forming process performed by the teeth forming machine in FIG. 9.

First, as shown in FIG. 10A, in a state where the upper die 160 and the lower die 161 are opened, the shaft member 2 is carried into the teeth forming die 150 from the side where the second pushrod 155 is disposed by the second conveying machine 105. The shaft member 2 is disposed at a predetermined position between the holding groove 162 of the upper die 160 and the holding groove 162 of the lower die 161 in a state where the flattened portion 6 faces the rack teeth forming die 151.

Here, the second conveying machine 105 includes a holding portion 170 and a moving mechanism 171 for moving the holding portion 170. The holding portion 170 is configured in the same manner as the holding portion 140 of the first conveying machine 104, can be inserted into the shaft portion 5 of the shaft member 2 and expanded in the radial direction, and is enlarged radially inside the shaft portion 5 to hold the radially inner side of the shaft portion 5. The holding portion 170 is disposed so as to face the second communication hole 164 of the teeth forming die 150 on the axis of the cylindrical molding space, and is moved back and forth along the axis.

Figure 10B:
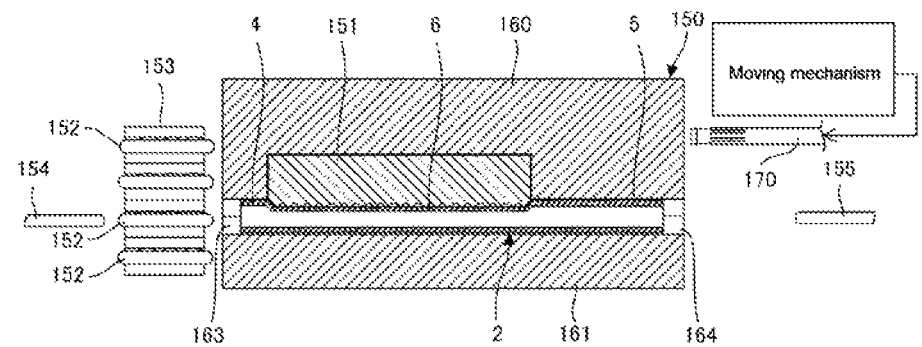
FIG. 10B is a schematic view of a teeth forming process performed by the teeth forming machine in FIG. 9.

Next, as shown in FIG. 10B, the upper die 160 and the lower die 161 are closed. The entire shaft member 2 is accommodated in the molding space, and the outer peripheral surface of the shaft member 2 is held by each of the holding grooves 162 of the upper die 160 and the lower die 161. In addition, the rack teeth forming die 151 is pressed against the flat outer surface of the flattened portion 6. Then, the holding portion 170 of the second conveying machine 105 releases the holding of the shaft portion 5 of the shaft member 2, is retracted from the teeth forming die 150, and is disposed away from the axis of the molding space.

Figure 10C:
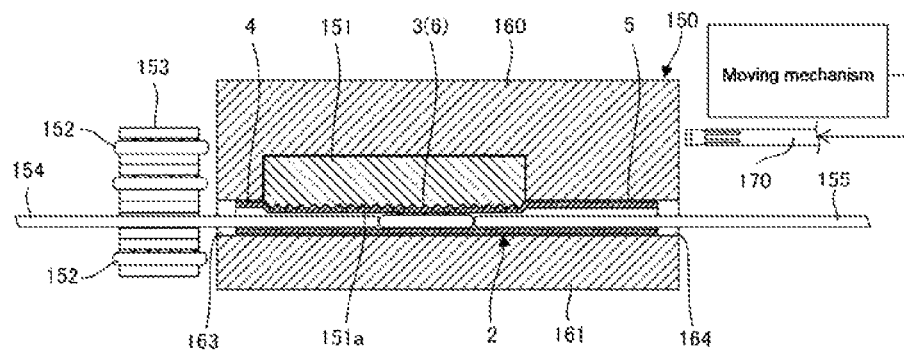
FIG. 10C is a schematic view of a teeth forming process performed by the teeth forming machine in FIG. 9.

Next, as shown in FIG. 10C, the first pushrod 154 is driven, and one mandrel 152 is inserted into the shaft member 2 from the opening of the shaft portion 4 through the first communication hole 163 of the teeth forming die 150, and is press-fitted inside the flattened portion 6. Then, the second pushrod 155 is driven, and the mandrel 152 press-fitted inside the flattened portion 6 is pushed back by the second pushrod 155 and discharged from the shaft member 2. The mandrel 152 discharged from the shaft member 2 is stored again in the mandrel holder 153.

In a process in which the mandrel 152 is reciprocated over the entire length of the flattened portion 6, the material of the flattened portion 6 is squeezed by the mandrel 152 and plastically deformed toward the rack teeth forming die 151. As the mandrel 152 is gradually changed to a larger one, and the press-fitting of the core metal 152 is repeated, the material of the flattened portion 6 gradually enters into the tooth grooves on the surface 151a of the rack teeth forming die 151. Thus, the shape of the surface 151a is transferred to the flattened portion 6, and the rack teeth 3 are formed in the flattened portion 6.

Figure 10D:
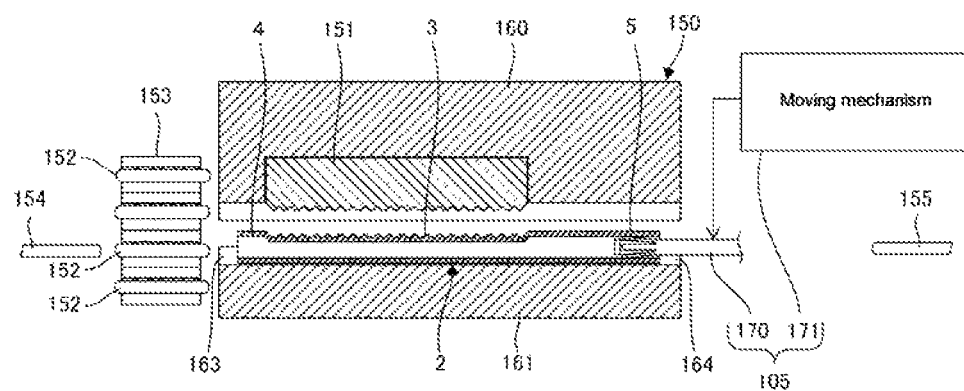
FIG. 10D is a schematic view of a teeth forming process performed by the teeth forming machine in FIG. 9.

Next, as shown in FIG. 10D, the holding portion 170 of the second conveying machine 105 is inserted into the shaft portion 5 of the shaft member 2 through the second communication hole 164 of the teeth forming die 150, and holds the radially inner side of the shaft portion 5 again. Then, the upper die 160 and the lower die 161 are opened in a state where the shaft member 2 is held by the holding portion 170.

Figure 10E:
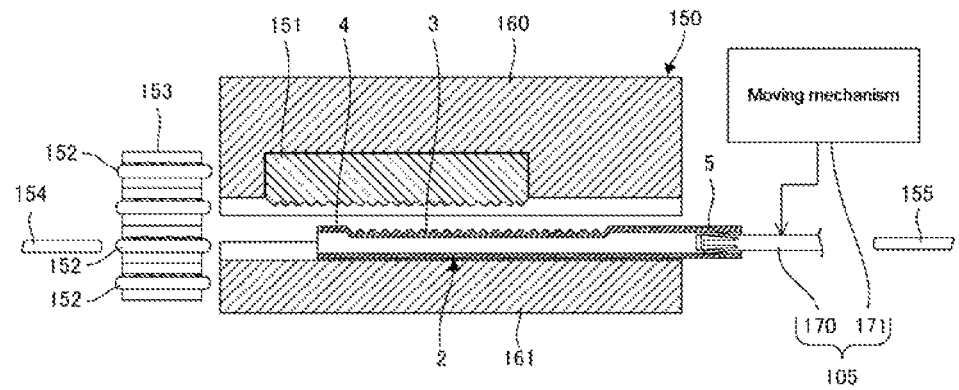
FIG. 10E is a schematic view of a teeth forming process performed by the teeth forming machine in FIG. 9.

Then, as shown in FIG. 10E, the second conveying machine 105 holding the shaft member 2 is retracted from the teeth forming die 150. Accordingly, the shaft member 2 is carried out from the teeth forming die 150.

Also in the teeth forming process shown in FIGS. 10A to 10E, the entire shaft member 2 is accommodated in the teeth forming die 150, but the holding portion 170 can hold the radially inner side of the shaft portion 5 of the shaft member 2 through the second communication hole 164 of the teeth forming die 150, and can carry in and out of the shaft member 2.

Figure 11:
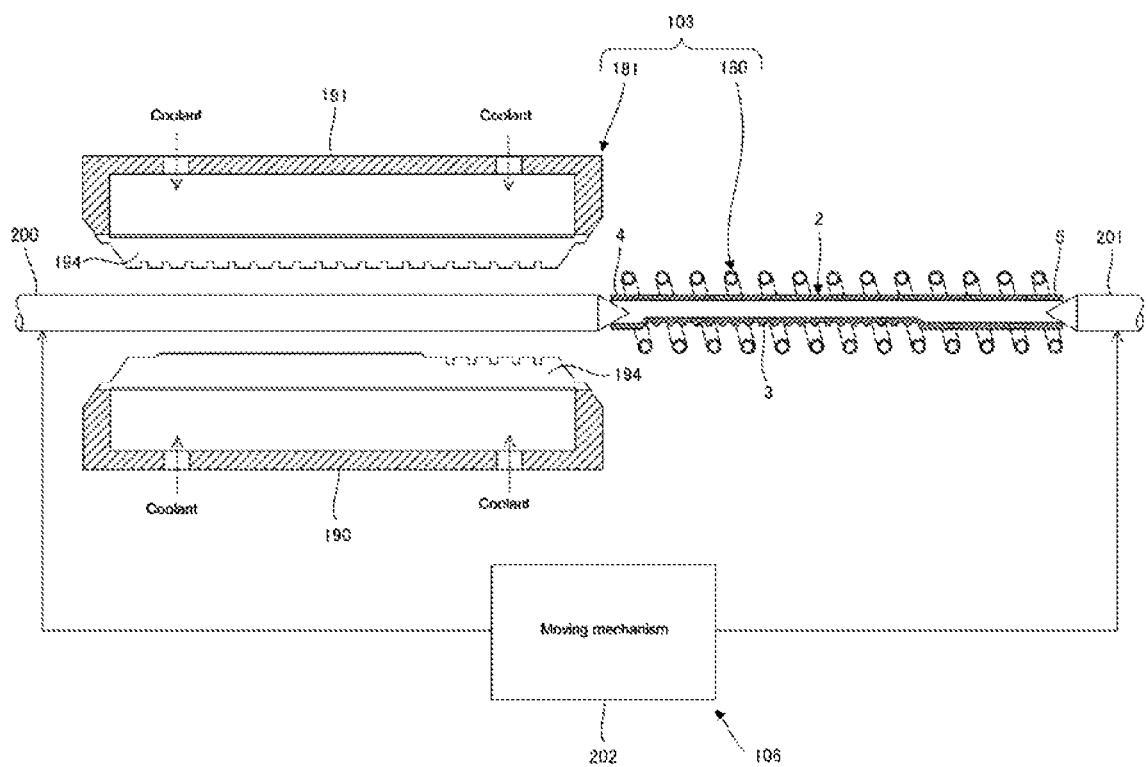
FIG. 11 is a schematic view of a heat treatment machine and a third conveying machine of the rack bar manufacturing apparatus in FIG. 3.
Figure 12:
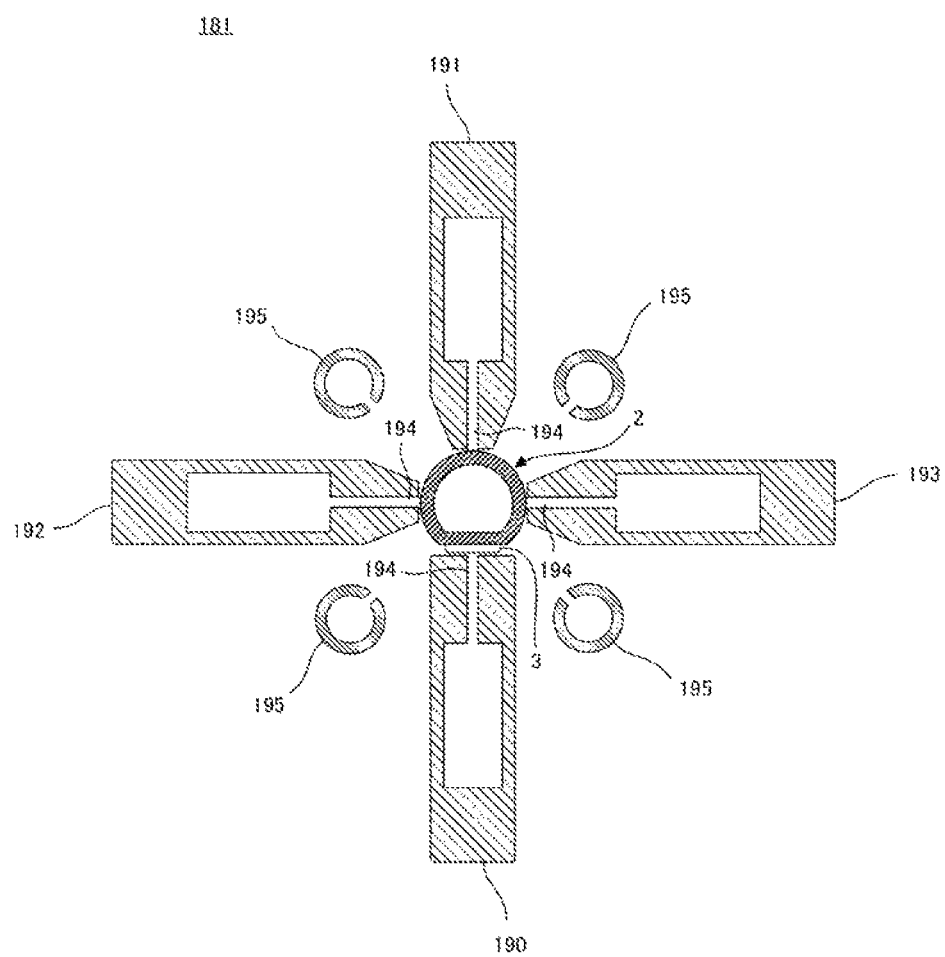
FIG. 12 is a vertical cross-sectional view of a cooling jacket of the heat treatment machine in FIG. 11.

FIGS. 11 and 12 show an example of the heat treatment machine 103 and the third conveying machine 106.

The heat treatment machine 103 includes a heating coil 180 and a cooling jacket 181.

The heating coil 180 is formed by spirally winding a tube member made of a good conductive material such as copper, and can accommodate the entire shaft member 2. The shaft member 2 accommodated in the heating coil 180 is surrounded by the heating coil 180, and is inductively heated by supplying a high-frequency current from a power source (not shown) to the heating coil 180.

The cooling jacket 181 is provided adjacent to the heating coil 180 in the axial direction of the spiral heating coil 180. The cooling jacket 181 includes four jacket members 190, 191, 192, and 193, and the jacket members 190, 191, 192, and 193 are disposed at intervals of 90° around the axis of the heating coil 180. The jacket members 190, 191, 192, and 193 each have a length equal to or longer than the entire length of the shaft member 2.

At least one of the jacket members 190, 191 disposed with the shaft member 2 sandwiched in the upper-lower direction is driven by a pressure mechanism (not shown) to restrain the shaft member 2 in the upper-lower direction. At least one of the jacket members 192, 193 disposed with the shaft member 2 sandwiched in the left-right direction is also driven by a pressure mechanism (not shown) to restrain the shaft member 2 in the left-right direction. The jacket members 190, 191, 192, and 193 spray coolant from a slit-shaped spraying nozzle 194 in a state in which the shaft member 2 is restrained. The coolant sprayed from the jacket members 190, 191, 192, and 193 is blown to the outer peripheral surface of the shaft member 2, thereby quenching the rack teeth 3.

In the example shown in FIG. 12, four auxiliary jacket members 195 for assisting cooling of the shaft member 2 are provided in the cooling jacket 181. Each of the auxiliary jacket member 195 is disposed between two adjacent jacket members among the four jacket members 190, 191, 192, and 193, and sprays the coolant toward the outer peripheral surface of the shaft member 2 exposed between two adjacent jacket members. In this manner, the auxiliary jacket members 195 that assist the cooling of the shaft member 2 may be appropriately added.

In the shaft member 2 on which the rack teeth 3 are formed, bending is likely to occur due to quenching since the sectional shape of the rack toothed section is non-circular and the residual stress during rack processing is high, but bending accompanying quenching is suppressed by quenching the rack teeth 3 in a state where the shaft member 2 is restrained from a plurality of radial directions over the entire length. The number of jacket members for constraining the shaft member 2 is not particularly limited, but preferably, the jacket member is disposed uniformly around the axis of the heating coil 180.

The third conveying machine 106 includes a pair of centers 200, 201, and a moving mechanism 202 that moves the pair of centers 200, 201. The third conveying machine 106 holds the shaft member 2 in the axial direction by using the pair of centers 200, 201. The conical tip end portion of the center 200 is inserted into the shaft portion 4 of the shaft member 2 to support the radially inner side of the shaft portion 4, and the conical tip end portion of the center 201 is inserted into the shaft portion 5 of the shaft member 2 to support the radially inner side of the shaft portion 5. The pair of centers 200, 201 is disposed on the axis of the heating coil 180 with the heating coil 180 and the cooling jacket 181 sandwiched, and is moved through the heating coil 180 and the cooling jacket 181 along the axis of the heating coil 180. The pair of centers 200, 201, and the moving mechanism 202 are configured to be able to follow expansion due to heating of the shaft member 2 and contraction due to cooling of the shaft member 2.

FIGS. 13A to 13D show the heat treatment process performed by the heat treatment machine 103.

Figure 13A:
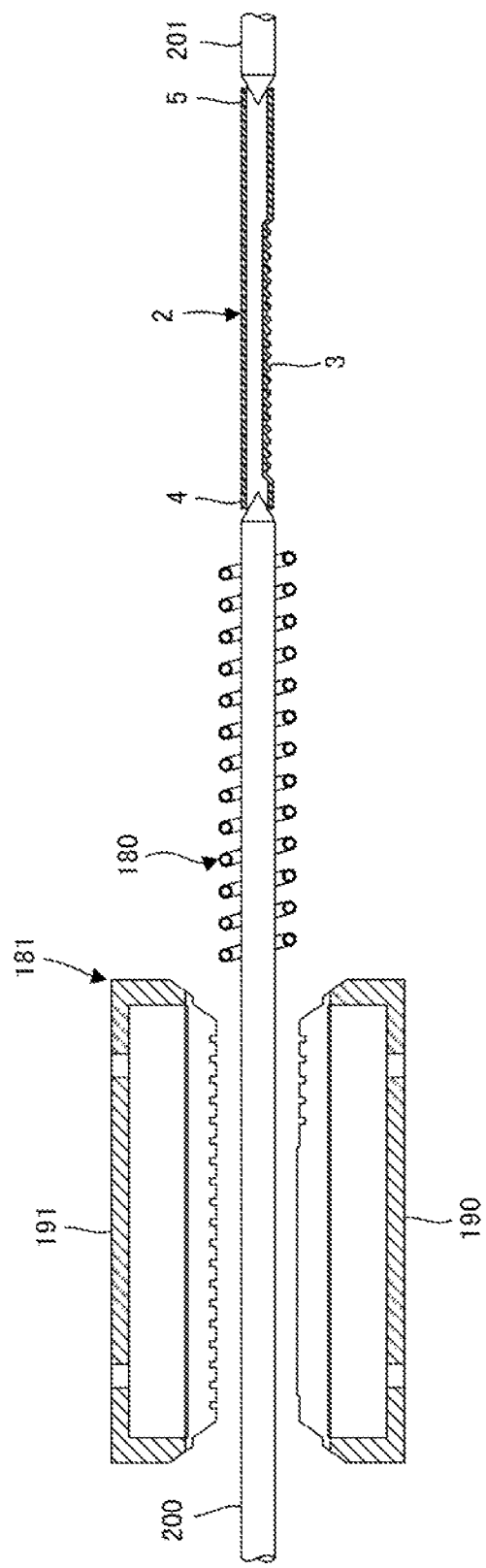
FIG. 13A is a schematic view of a heat treatment process performed by the heat treatment machine in FIG. 11.

First, as shown in FIG. 13A, the shaft member 2 is disposed on the axis of the heating coil 180 and adjacent to the heating coil 180 on the side opposite to the cooling jacket 181. Then, one center 200 passes through the heating coil 180 and the cooling jacket 181, and is moved from the cooling jacket 181 side toward the heating coil 180 side. Accordingly, the shaft member 2 is gripped by the pair of centers 200, 201.

Figure 13B:
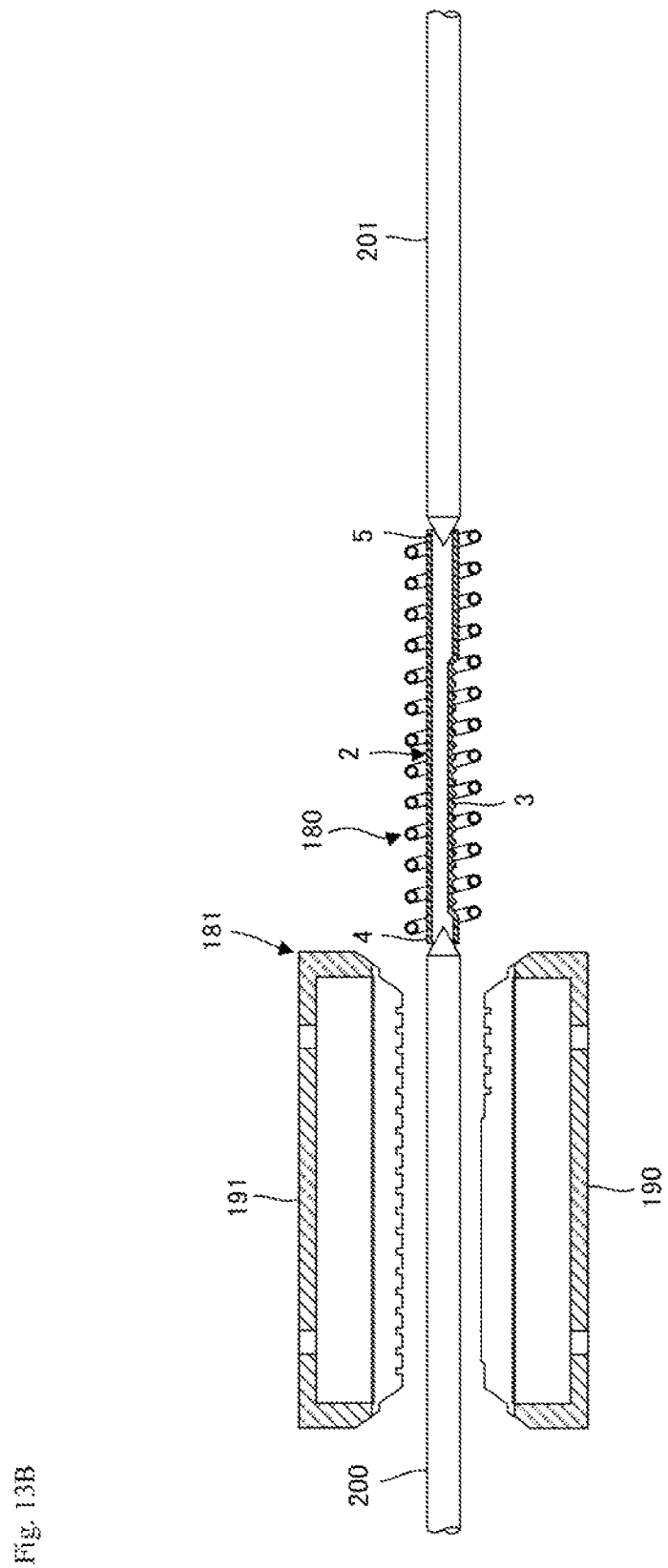
FIG. 13B is a schematic view of a heat treatment process performed by the heat treatment machine in FIG. 11.

Next, as shown in FIG. 13B, the pair of centers 200, 201 is moved, and the shaft member 2 is accommodated in the heating coil 180. Then, the high-frequency current is supplied to the heating coil 180, and the shaft member 2 is inductively heated.

Next, as shown in FIG. 13C, the pair of centers 200, 201 is moved, and the shaft member 2 is accommodated in the cooling jacket 181. Then, the shaft member 2 is restrained by the jacket members 190, 191, 192, and 193 of the cooling jacket 181, and is blown with the coolant in a restrained state. Accordingly, the rack teeth 3 are quenched.

Figure 13D:
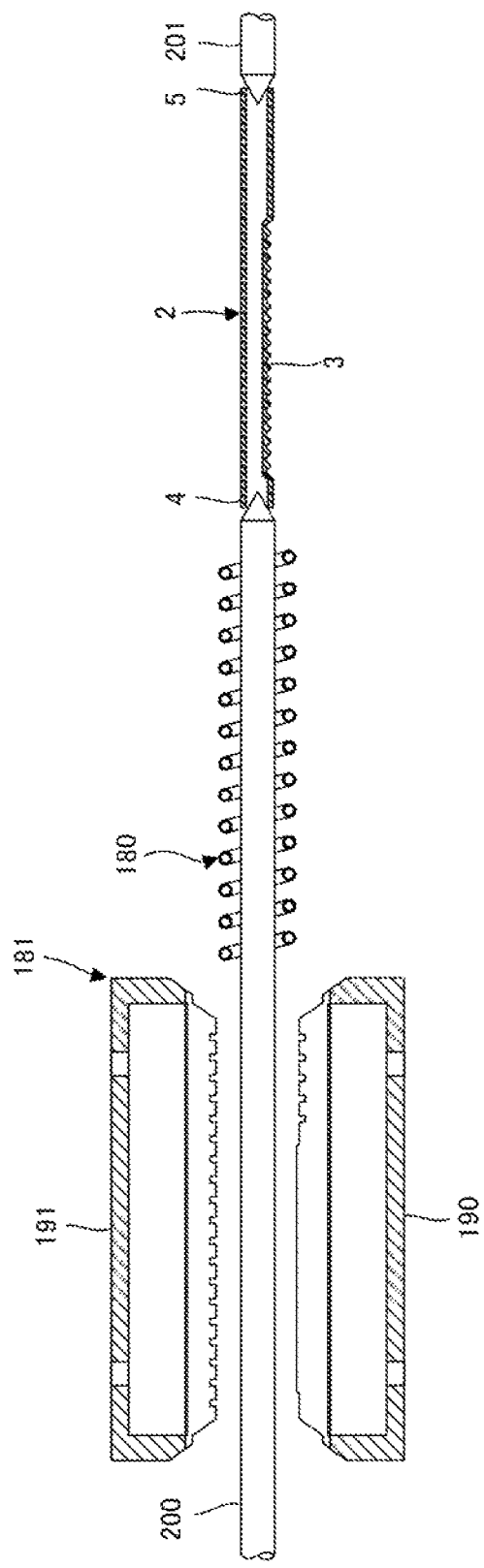
FIG. 13D is a schematic view of a heat treatment process performed by the heat treatment machine in FIG. 11.

Then, as shown in FIG. 13D, the pair of centers 200, 201 is moved toward the heating coil 180 side, and the shaft member 2 is carried out from the cooling jacket 181 and the heating coil 180.

Also in the heat treatment process shown in FIGS. 13A to 13D, the entire shaft member 2 is accommodated in the heating coil 180 and accommodated in the cooling jacket 181, but the pair of centers 200, 201 can carry in and out the shaft member 2 by gripping the shaft member 2 in the axial direction through the heating coil 180 and the cooling jacket 181. Further, by moving the shaft member 2 in the axial direction from the heating coil 180 to the cooling jacket 181, the time required from the heating to the start of cooling is shortened, so that oxidation of the surface of the shaft member 2 can be suppressed, and there is an effect of suppressing adhesion of the scale to the surface of the shaft member 2.

Figure 14:
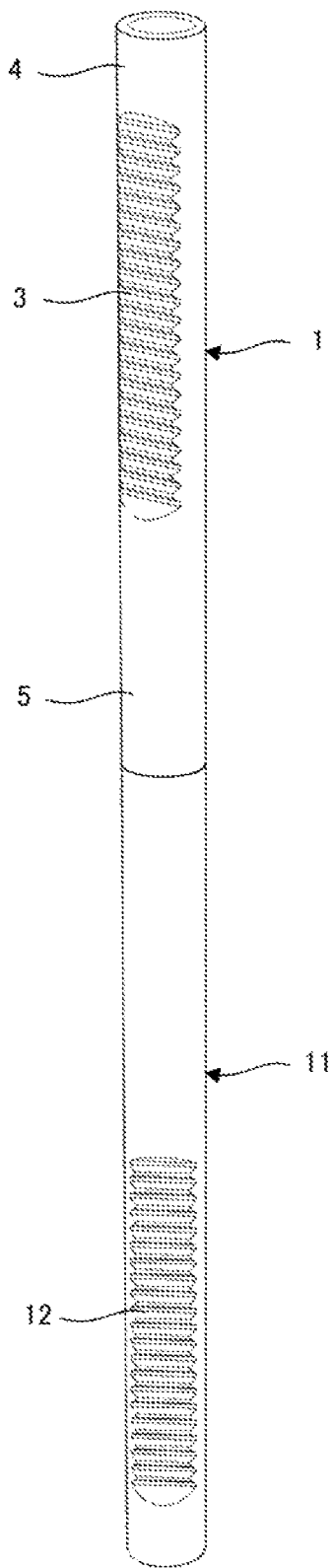
FIG. 14 is a perspective view of another example of a rack bar for explaining an embodiment of the present invention.

FIG. 14 shows another example of a rack bar for explaining an embodiment of the present invention.

In the rack bar 10 shown in FIG. 14, a solid extension shaft member 11 is joined to one shaft portion 5 of the hollow rack bar 1 described above, and rack teeth 12 as a linear motion structure in the axial direction are formed in the extension shaft member 11. The rack bar 10 includes two sets of rack teeth—the rack teeth 3 of the hollow rack bar 1 and the rack teeth 12 of the extension shaft member 11, and is suitably used for a dual pinion assist electric power steering apparatus. A predetermined rotation angle difference is set around the center axis of the rack bar 10 in the two racks 3 and 12 according to the positional relationship between the steering shaft of the vehicle and the assist mechanism.

Figure 15A:
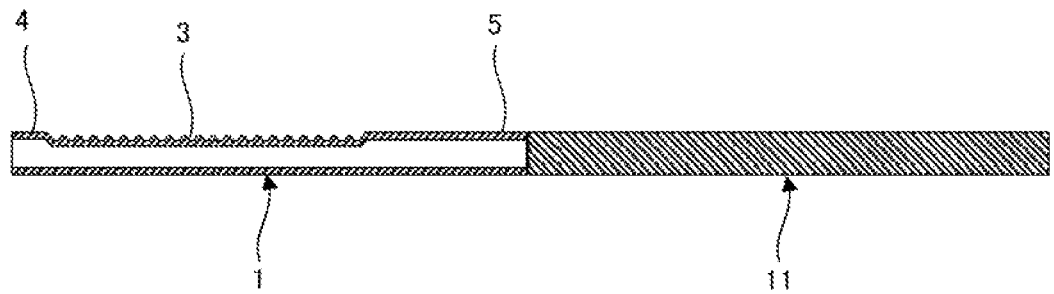
FIG. 15A is a schematic view of an example of a manufacturing process of the rack bar in FIG. 14.
Figure 15B:
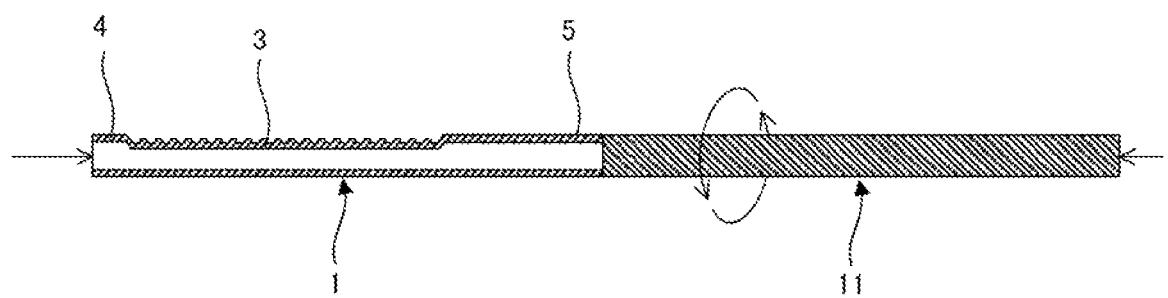
FIG. 15B is a schematic view of an example of a manufacturing process of the rack bar in FIG. 14.
Figure 15C:
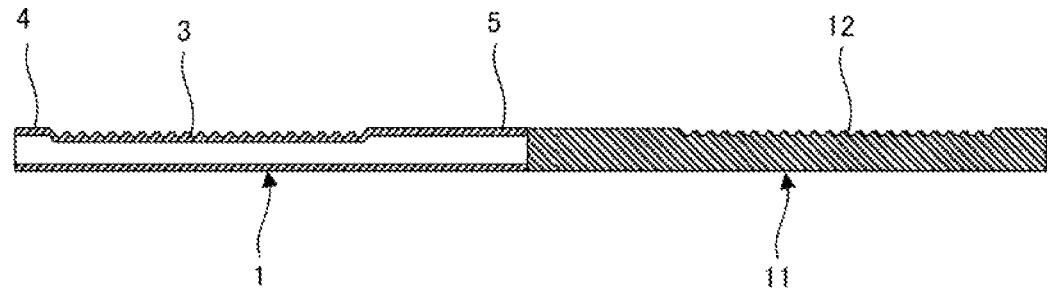
FIG. 15C is a schematic view of an example of a manufacturing process of the rack bar in FIG. 14.

FIGS. 15A to 15C show an example of a manufacturing process of the rack bar 10.

First, as shown in FIG. 15A, the hollow rack bar 1 on which the rack teeth 3 are formed and the extension shaft member 11 are coaxially disposed. Then, the shaft portion 5 of the hollow rack bar 1 and one end portion of the extension shaft member 11 are abutted.

Next, as shown in FIG. 15B, the extension shaft member 11 is rotated about the central axis. As the hollow rack bar 1 and the extension shaft member 11 rotate relative to each other, frictional heat is generated at the abutting surfaces of the hollow rack bar 1 and the extension shaft member 11. The frictional heat causes a change in the metal structure of the abutting surfaces, and the pressure is further applied, so that the hollow rack bar 1 and the extension shaft member 11 are in pressure-contact with each other. The method of joining the hollow rack bar 1 and the extension shaft member 11 is not limited to friction pressure welding, and may be welding, for example.

Then, as shown in FIGS. 15C, the rack teeth 12 are formed at a predetermined portion of the extension shaft member 11 using a processing apparatus such as a broaching machine. The rack teeth 12 are formed at a predetermined angle with respect to the rack teeth 3 of the hollow rack bar 1. The linear motion structure formed on the extension shaft member 11 is not limited to the rack teeth 12, and may be, for example, a screw groove of a ball screw or the like. The screw groove is formed in the extension shaft member 11 using, for example, a whirling apparatus after the hollow rack bar 1 and the extension shaft member 11 are joined.

The extension shaft member 11 may be a hollow shaft member. When the extension shaft member 11 is a hollow shaft member, the rack teeth 12 of the extension shaft member 11 are formed in the same manner as the rack teeth 3 of the hollow rack bar 1 before the hollow rack bar 1 and the extension shaft member 11 are joined. In this case, for example, when the hollow rack bar 1 and the extension shaft member 11 are brought into frictional contact with each other by the rotation angle difference of the two racks 3, 12, relative rotation of the hollow rack bar 1 and the extension shaft member 11 is suddenly stopped at a timing when a desired rotation angle difference of the two racks 3, 12 is obtained. Accordingly, a desired rotation angle difference between the two racks 3, 12 is obtained.

An apparatus for manufacturing a rack bar includes a pre-forming machine configured to form a flattened portion extending in an axial direction of a hollow shaft member on an outer peripheral surface of the hollow shaft member, a teeth forming machine configured to form rack teeth on a flat outer surface of the flattened portion, a heat treatment machine configured to quench the rack teeth, a first conveying machine configured to carry the hollow shaft member into the pre-forming machine and to carry out the hollow shaft member on which the flattened portion is formed from the pre-forming machine, a second conveying machine configured to carry the hollow shaft member on which the flattened portion is formed into the teeth forming machine and to carry out the hollow shaft member on which the rack teeth are formed on the flattened portion from the teeth forming machine, and a third conveying machine configured to carry the hollow shaft member on which the rack teeth are formed into the heat treatment machine and to carry out the hollow shaft member in which the rack teeth are quenched from the heat treatment machine. The first conveying machine, the second conveying machine, and the third conveying machine are configured to hold at least one end of the hollow shaft member from a radially inner side of the hollow shaft member.

The pre-forming machine includes a pre-forming die configured to hold the outer peripheral surface of the hollow shaft member, and a flattening punch configured to be pressed against the outer peripheral surface of the hollow shaft member while the pre-forming die holds the hollow shaft member. The pre-forming die is capable of accommodating the hollow shaft member over an entire length of the hollow shaft member, the pre-forming die including a communication hole configured to expose the at least one end of the hollow shaft member outward from the pre-forming die.

The first conveying machine includes a first holding portion configured to be insertable into the at least one end of the hollow shaft member and configured to be expandable and contractible in a radial direction. The first holding portion is configure to hold the at least one end of the hollow shaft member from the radially inner side of the hollow shaft member when the first holding portion is expanded in the radial direction inside the at least one end of the hollow shaft member, the first holding portion being disposed inside the at least one end of the hollow shaft member accommodated in the pre-forming die through the communication hole.

The teeth forming machine includes a teeth forming die configured to hold the outer peripheral surface of the hollow shaft member, a rack teeth forming die configured to be pressed against the flattened portion of the hollow shaft member while the teeth forming die holds the hollow shaft member, and a plurality of mandrels configured to be pressed into the shaft member while the teeth forming die holds the hollow shaft member. The teeth forming die is capable of accommodating the hollow shaft member over an entire length of the hollow shaft member, the teeth forming die having a first communication hole configured to expose a first end of the hollow shaft member outward from the teeth forming die, and a second communication hole configured to expose a second end of the hollow shaft member outward from the teeth forming die. The plurality of mandrels are configured to be pressed one by one in order into the shaft member accommodated in the teeth forming die through the first communication hole. The second conveying machine includes a second holding portion configured to be insertable into the second end of the hollow shaft member and configured to be expandable and contractible in a radial direction. The second holding portion is configured to hold the second end of the hollow shaft member from the radially inner side of the hollow shaft member when the second holding portion is expanded in the radial direction inside the second end of the hollow shaft member, the second holding portion being disposed inside the second end of the hollow shaft member accommodated in the teeth forming die through the second communication hole.

The heat treatment machine includes a heating coil configured to surround the outer peripheral surface of the hollow shaft member, and a cooling jacket configured to spray a coolant from a plurality of nozzles in a radial direction to the outer peripheral surface of the hollow shaft member heated by the heating coil. The heating coil is configured to be capable of accommodating the hollow shaft member over an entire length of the hollow shaft member. The heating coil and the cooling jacket are disposed next to each other in an axial direction of the heating coil. The third conveying machine includes a pair of centers configured to be inserted into both ends of the hollow shaft member to hold the hollow shaft member between the pair of centers in the axial direction. The pair of centers is disposed to extend on a central axis of the heating coil, the pair of centers being configured to be moved through the heating coil and the cooling jacket along the central axis.

A method for manufacturing a rack bar includes forming a flattened portion extending in an axial direction of a hollow shaft member on an outer peripheral surface of the hollow shaft member, forming rack teeth on a flat outer surface of the flattened portion; and quenching the rack teeth. Each of the forming of the flattened portion, the forming of the rack teeth and the quenching comprises conveying the hollow shaft member while holding a radially inner side in at least one end of the hollow shaft member from a radially inner side of the hollow shaft member.

The method further includes joining a hollow or solid extension shaft member to one end of the rack bar, and forming a linear motion structure on the extension shaft member in an axial direction of the extension shaft member.

This application claims priority to Japanese Patent Application No. 2018-199511 filed on Oct. 23, 2018, the entire content of which is incorporated herein by reference.

The invention claimed is:

1. An apparatus for manufacturing a rack bar, the apparatus comprising:
   a pre-forming machine configured to form a flattened portion extending in an axial direction of a hollow shaft member on an outer peripheral surface of the hollow shaft member;
   a teeth forming machine configured to form rack teeth on a flat outer surface of the flattened portion;
   a heat treatment machine configured to quench the rack teeth;
   a first conveying machine configured to carry the hollow shaft member into the pre-forming machine and to carry out the hollow shaft member on which the flattened portion is formed from the pre-forming machine;
   a second conveying machine configured to carry the hollow shaft member on which the flattened portion is formed into the teeth forming machine and to carry out the hollow shaft member on which the rack teeth are formed on the flattened portion from the teeth forming machine; and
   a third conveying machine configured to carry the hollow shaft member on which the rack teeth are formed into the heat treatment machine and to carry out the hollow shaft member in which the rack teeth are quenched from the heat treatment machine,
   wherein the first conveying machine, the second conveying machine, and the third conveying machine are configured to hold at least one end of the hollow shaft member from a radially inner side of the hollow shaft member.

2. The apparatus according to claim 1, wherein the pre-forming machine includes:
   a pre-forming die configured to hold the outer peripheral surface of the hollow shaft member; and
   a flattening punch configured to be pressed against the outer peripheral surface of the hollow shaft member while the pre-forming die holds the hollow shaft member,
   wherein the pre-forming die is capable of accommodating the hollow shaft member over an entire length of the hollow shaft member, the pre-forming die including a communication hole configured to expose the at least one end of the hollow shaft member outward from the pre-forming die,
   wherein the first conveying machine includes a first holding portion configured to be insertable into the at least one end of the hollow shaft member and configured to be expandable and contractible in a radial direction, and
   wherein the first holding portion is configure to hold the at least one end of the hollow shaft member from the radially inner side of the hollow shaft member when the first holding portion is expanded in the radial direction inside the at least one end of the hollow shaft member, the first holding portion being disposed inside the at least one end of the hollow shaft member accommodated in the pre-forming die through the communication hole.

3. The apparatus according to claim 1,
wherein the teeth forming machine includes:
   a teeth forming die configured to hold the outer peripheral surface of the hollow shaft member;
   a rack teeth forming die configured to be pressed against the flattened portion of the hollow shaft member while the teeth forming die holds the hollow shaft member; and
   a plurality of mandrels configured to be pressed into the shaft member while the teeth forming die holds the hollow shaft member,
   wherein the teeth forming die is capable of accommodating the hollow shaft member over an entire length of the hollow shaft member, the teeth forming die having a first communication hole configured to expose a first end of the hollow shaft member outward from the teeth forming die, and a second communication hole configured to expose a second end of the hollow shaft member outward from the teeth forming die,
   wherein the plurality of mandrels are configured to be pressed one by one in order into the shaft member accommodated in the teeth forming die through the first communication hole,
   wherein the second conveying machine includes a second holding portion configured to be insertable into the second end of the hollow shaft member and configured to be expandable and contractible in a radial direction, and
   wherein the second holding portion is configured to hold the second end of the hollow shaft member from the radially inner side of the hollow shaft member when the second holding portion is expanded in the radial direction inside the second end of the hollow shaft member, the second holding portion being disposed inside the second end of the hollow shaft member accommodated in the teeth forming die through the second communication hole.

4. The apparatus according to claim 1,
wherein the heat treatment machine includes:
a heating coil configured to surround the outer peripheral surface of the hollow shaft member; and
a cooling jacket configured to spray a coolant from a plurality of nozzles in a radial direction to the outer peripheral surface of the hollow shaft member heated by the heating coil,
wherein the heating coil is configured to be capable of accommodating the hollow shaft member over an entire length of the hollow shaft member,
wherein the heating coil and the cooling jacket are disposed next to each other in an axial direction of the heating coil,
wherein the third conveying machine includes a pair of centers configured to be inserted into both ends of the hollow shaft member to hold the hollow shaft member between the pair of centers in the axial direction, and
wherein the pair of centers is disposed to extend on a central axis of the heating coil, the pair of centers being configured to be moved through the heating coil and the cooling jacket along the central axis.

* * * * *